United States Patent [19]
Nimmo

[11] 3,795,800
[45] Mar. 5, 1974

[54] WATCHDOG RELOAD INITIALIZER

[75] Inventors: John L. Nimmo, Natick; Peter I. Morley, Bellingham, both of Mass.

[73] Assignee: Honeywell Information Systems Inc., Waltham, Mass.

[22] Filed: Sept. 13, 1972

[21] Appl. No.: 288,634

[52] U.S. Cl. .................. 235/153 AK, 340/172.5
[51] Int. Cl. .................. G06f 11/04
[58] Field of Search .................. 235/153 AK, 153 R; 340/172.5, 146.1 C, 146.1 R

[56] References Cited
UNITED STATES PATENTS

| | | | |
|---|---|---|---|
| 3,226,684 | 12/1965 | Cox | 235/153 AK |
| 3,259,881 | 7/1966 | Doyle et al. | 235/153 AK |
| 3,286,239 | 11/1966 | Thompson et al. | 340/172.5 |
| 3,518,413 | 6/1970 | Holtey | 235/153 AK |
| 3,688,263 | 8/1972 | Balogh, Jr. et al. | 340/172.5 |

*Primary Examiner*—Charles E. Atkinson
*Attorney, Agent, or Firm*—John M. Gunther; Ronald T. Reiling

[57] ABSTRACT

A watchdog reload initializer is disclosed which monitors communication between a remote processing system and a central processing system. Upon detection of a condition which may indicate that a malfunction has occurred in the remote processing system, the watchdog reload initializer causes the remote processing system to disconnect from a communications link for a predetermined period of time. Subsequently, the watchdog reload initializer initiates a series of operations which normalize the system and reestablishes communication with the central processing system.

13 Claims, 10 Drawing Figures

WATCHDOG RELOAD INITIALIZER

BACKGROUND OF THE INVENTION

1. Field of the Invention

This invention relates generally to communication system apparatus and more particularly is concerned with an apparatus which automatically controls a remote processing system once a malfunction in the remote processing system has occurred.

2. Description of the Prior Art

Previous attempts at loading a remote processing system from a central processing system have utilized a dedicated line environment. In a dedicated line environment, the remote processor has continuous connection to a data set and its associated communication path into the central processing system. In order to justify the expense of a dedicated line, continuous communication between the remote processing system and the central processing system is needed. If it is not present, then the data set and phone line are not economically used from the viewpoint of both the user and the central processing unit. This results since the user has to pay for the amount of time he is engaging a data set whether or not he is in actual communication with the central processing system. Therefore, he is paying for dead time, i.e., computer time in which no data is being transferred either from the user to the central processing system or from the central processing system to the user. Moreover, since the central processing system is limited to the number of users that it can be serving by the number of data sets connected it it, further inefficiencies with respect to the communication systems result. These inefficiencies are overcome by providing a switch line environment.

In furnishing a remote processing system using a switched line environment, however, additional features are needed in order to provide proper connections between the remote processing system and the central processing system. These features are further complicated when an error condition results in the remote processing system. Under this circumstance, an operator has been needed to clear the remote processing system and start the remote processor running again. However, it is highly expensive to train an operator to perform these functions and, moreover, to have him continuously attending to the remote processing system. Hence, it has been recognized that an unattended mode of operation is needed in a remote processing system when a malfunction occurs.

This problem of unattended operation is also complicated by the fact that most of the remote processors have only a few storage locations of protected core in which to receive a new program. These protected locations are not sufficient to provide the remote processor with enough steps to have the malfunctioning program reloaded.

The apparatus of the present invention overcomes these prior art problems and in addition allows great versatility and speed because of its implementation and concomitant lack of supervision. Moreover, the apparatus of the present invention utilizes only a minimum amount of protected core locations in a remote processor.

OBJECT OF THE INVENTION

It is an object of the invention is provide in a remote processing communication system an automatic, unattended mode of operation for recovering from a system malfunction.

It is a further object of the invention to provide a watchdog reload initializer having the ability to reconnect and normalize a remote processing system which was disconnected because of a malfunction.

It is another object of the invention to provide an apparatus for a remote processing system in which a malfunction causes a series of control routines to be executed which initiate corrective steps to overcome the problem and cause the remote processor system to be reloaded from the central processing system.

It is yet another object of the invention to provide an improved, flexible apparatus for use in conjunction with a central processing system, which apparatus services to connect and disconnect a remote processing system in optimum fashion.

It is a primary object of the invention to define a novel and useful combination of control signals to control a remote processing system.

SUMMARY OF THE INVENTION

In accomplishing the above and other desired aspects of the present invention, Applicants have invented novel apparatus for use in a remote processing system connected to a communication link. After sensing that a malfunction has occurred in the remote processing system, logic circuitry in conjunction with a timing circuit initiates conditioning signals for the sequential operation of a remote processor and a data set in the remote processing system. A timing circuit within a watchdog reload initializer times out a predetermined time delay. If a software instruction indicating proper operation is not monitored by the watchdog reload initializer during the delay period, a malfunction condition is assumed. The timing circuit then provides a data set with a signal that effectively disconnects the data set. Following this, the watchdog reload initializer provides a series of operations to normalize the remote processor and data set. These series of operations include clearing the remote processor in the remote processing unit of all previous information, disconnecting the remote processing system form the phone line for a predetermined time period, initializing theremote processing system such that it can receive a return message from the central processing unit, and setting up the remote processor in the remote processing system so that it can receive the message from the central processing unit. ONce these operations have occurred the remote processing system is then loaded with the information it had prior to the condition which caused the malfunction.

DESCRIPTION OF THE DRAWINGS

For a more complete understanding of the invention, as well as other objects and further features thereof, reference may be had to the f0llowint detailed description of the preferred embodiment in conjunction with the drawings wherein.

DETAILED DESCRIPTION OF THE PREFERRED EMBODIMENT

Figure 1:
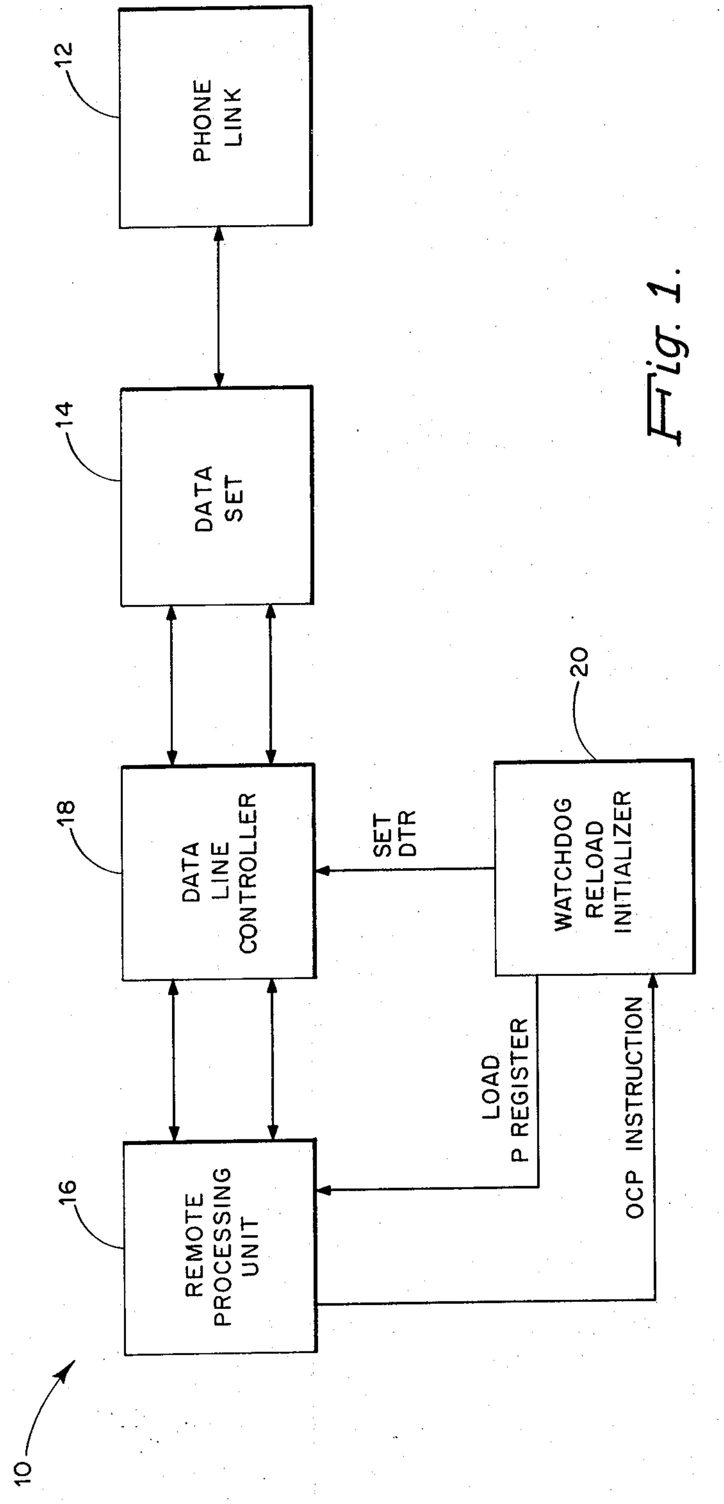
FIG. 1 is a block diagram of the communication environment in which the watchdog reload initializer is situated.

FIG. 1 illustrates the overall system in which the watchdog reload initializer of the present invention is used. More particularly, FIG. 1 illustrates a remote processing system 10. There are usually a plurality of remote processing systems 10 connected to a central processing system (not shown), but only one is needed for purposes or explanation. Each remote processing system 10 is connected to central processing system via a phone 12. A data set 14, which may be, for example, model 201 provided by the American Telephone & Telegraph Company, is connected between a phone 12 and a remote processing unit 16 (i.e., a remote processor) by way of a data line controller 18. The remote processor 16 is capable of either sending and/or receiving a message to the central processing system. This communication is entered into when certain signals are generated by the data line controller 18 and the data set 14 to indicate that communication between the remote processing system 10 and the central data processing system may be initiated.

More specifically, when the remote processor 16 is to receive a message from the central processing system, the operation of the remote processing system 10 would be as follows. Once the system is initialized, remote processor 16 enables a receiver (not shown) in the data line controller 18. The data line controller then provides a data terminal ready (DTR) signal to the data set 14 indicating to the remote processor 16 that it is ready to receive information. Before transmission of a message can occur, the data set 14 must be connected to the central processing system via phone 12. Once a phone connection is made, data set 14 has a carrier detect (CD) signal. Data set 14 subsequently provides a data set ready (DSR) signal to the data line controller 18 indicating that it is operative and may transmit a message. With the signals now present, communication between the remote processor 16 and the central processing system can commence. After the message has been terminated, the CD signal will go off. Remote processor 16 then changes the DTR signal and monitors the DSR signal. When the DTR signal changes, the data line controller 18 knows that the message is completed. When the DSR signal changes, the communication link has been terminated. In order to provide another message, remote processor 16 must provide another signal which would reestablish the DTR signal.

Connected to both the remote processor 16 and the data line controller 18 is a watchdog reload initializer 20. The watchdog initializer 20, which is shown in greater detail in FIG. 2, monitors the setting up of the communication link in addition to monitoring the program execution of the remote processor 16. With respect to the former, if after the DTR signal has been given to the data set 14, the phone is not answered and receiving valid data within a predetermined period of time, the watchdog reload initializer would terminate possible communication by automatically disabling the DTR signal in the data line controller 18. This is done so that erroneous incoming calls will not hold up the remote terminal system. With respect to the latter situation, i.e., when the remote processor 16 is either transmitting or receiving communication from the central data processing unit, the watchdog reload initializer monitors the software instruction executed in the remote processor 16. Under normal operation, an enabling instruction OCP 1054 is executed, within a ten second period. When this instruction is executed, a counter within the watchdog reload initializer 20 is reset allowing operations to continue. If some malfunction should occur such as an endless loop in a program, entering of an illegal instruction code, failure to store some of the information received, etc., this instruction may not be executed and hence monitored by the watchdog reload initializer 20. If this malfunction condition does occur, the watchdog reload initializer 20 will be activated and provide a series of operations which will disconnect the remote processor 16 from the communications link. The watchdog reload initializer will then set the remote processor 16 and the data line controller 18 to such a state that it will be able to reconnect with the central processing system to thereby reestablish communication.

Figure 2:
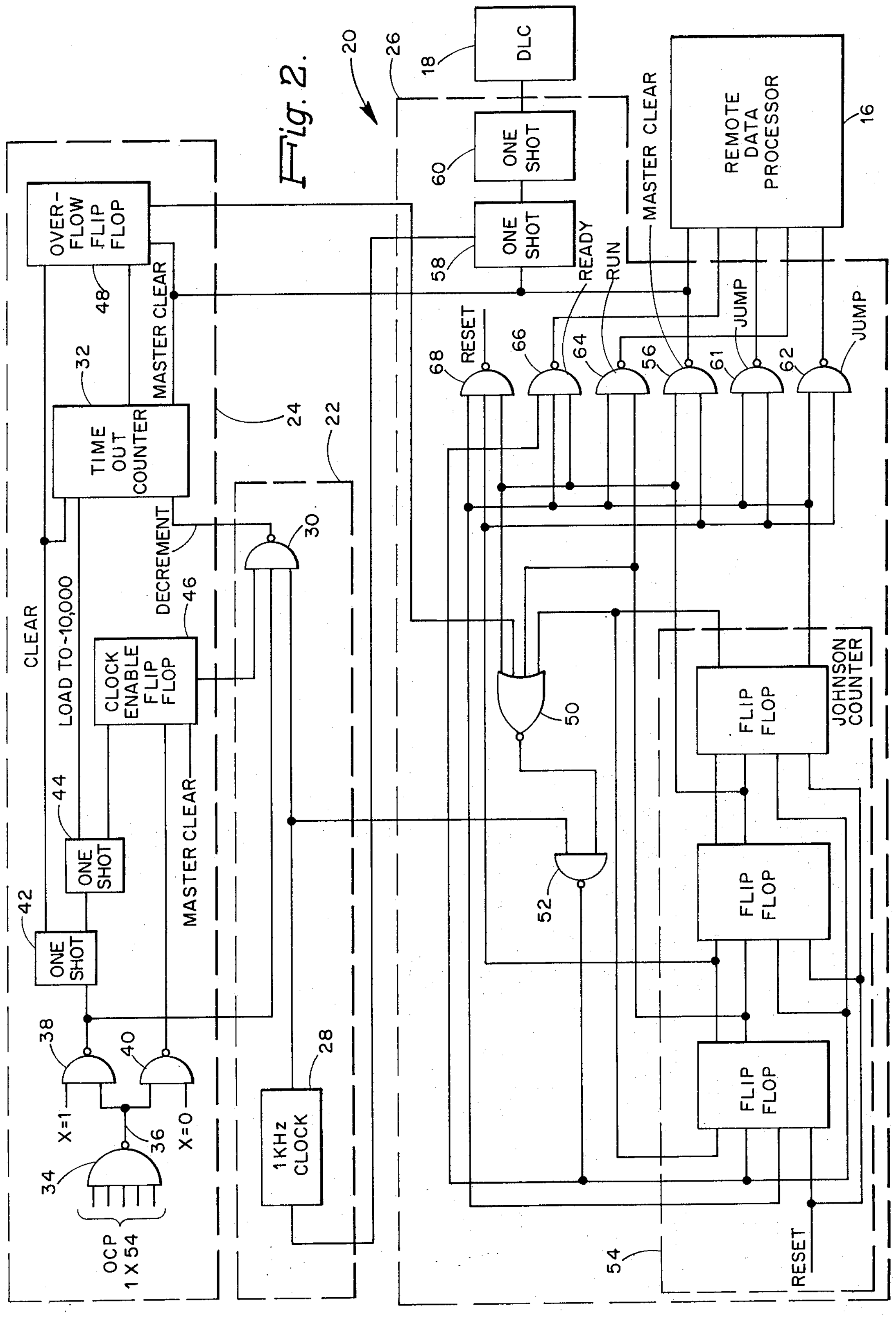
FIG. 2 is a logic diagram of the circuitry utilized in the watchdog reload initializer; and, FIGS. 3A–3H are timing diagrams illustrating the operation of the watchdog reload initializer.

More specifically, in referring to FIG. 2, the watchdog reload initializer comprises a multivibrator circuit 22, a time out circuit 24 and a pulse generating circuit 26. The multivibrator circuit 22 generates pulses at a 1 kilohertz clock frequency. These pulses are used to increment the time out circuit 24 and sequence the pulse generating circuit 26. The time out circuit 24 is used to time program operations. This is accomplished by setting a counter to a predetermined time interval by a program instruction OCP 1054. Once the counter is set, it must be either serviced by the program instruction executed in the remote processor 16 within ten seconds or the device must be turned off by a disable instruction OCP 1154. If the program fails to service or disable the option eithin this time interval, the counter overflows indicating a potential system malfunction. This error indication isused to initiate the pulse generating circuit 26.

Pulse generating circuit 26 generates a sequence of operations to normalize and start the remote terminal system 10 once an error indication exists. The overflow signal provided by the time out circuit 24 enables the pulse generating circuit 26 to receive pulses from the multivibrator circuit 22. The initial pulse to the pulse generating circuit 26 results in a master clear signal and places the remote terminal system 10 in the standard clear state. After a predetermined time interval, pulse generating circuit 26 generates a signal to the data line controller 18 which enables the receiver (not shown) of a data line controller 18 and provides a DTR signal. Subsequently, the pulse generating circuit 26 provides a jump signal which forces a program counter in the remote processor 16 to a starting address where a communications program is located. Following this, the pulse generator circuit 26 provides a run signal to the remote processor 16. This run signal, in conjunction with the succeeding ready signal, enables the remote processor's starting circuitry to be operational. If the data line controller 18 in conjunction with the data set 14 indicates that it is ready to transmit a message to the remote processor 16, then proper communications can be recommenced. If a communication link with the central data processing unit is not established within a period determined by the time out counter in the watchdog reload initializer, the watchdog reload intializer 20 will then disconnect the remote processing system 10 from the communications link and start the sequencing operations again. This sequence of events will continue until the watchdog reload initializer 20 monitors the software instruction OCP 1054 from the remote processor 16. This instruction resets the time out counter in the watchdog reload initializer thus ensuring that the time out counter does not time out.

Multivibrator circuit 22 includes a one kilohertz clock 28 which is connected to a NAND gate 30, hereinafter referred to as clock gate. When the other inputs connected to clock gate 30 have enabling signals, a clock gate 30 provides pulses to time out circuit 24 at the rate it receives them from 1 kilohertz clock 28. Each of these pulses of clock gate 30 increments time out circuit 24.

Time out circuit 24 includes a decode gate 34 which is responsive to each of the executed instructions of remote processor 16. However, only two program instructions affect the operation of the watchdog reload initializer. One of these instructions OCP 1054 enables the option such that continuous operation is realized while the other instruction OCP 1154 disables the option such that reinitialization is required.

When a software instruction OCP 1X54 is executed by the remote processor, decode gate 34 is enabled. Decode gate 34 provides a signal over line 36 to NAND gates 38 and 40. Each NAND gate 38 and 40 is also connected to the remote processor 16 and is responsive to the X value in OCP 1X54.

If the X is a zero, NAND gate 38 is enabled and provides a signal to clock gate 30. Gate 38 is also coupled to a one shot monostable multivibrator 42 which provides two functions. First, one shot 42 provides a signal to a time out counter 32 clearing the time out counter of any number it contains. Time out counter 32 may be, for example, a plurality of binary counters serially connected. The signal from one shot 42 sets the time out counter 32 to zero and resets possible overflow. One shot 42 also provides a signal to another one shot monostable multivibrator 44. This monostable multivibrator 44 also has two outputs. ONe output is connected to time out counter 32 and loads the time out counter with a first predetermined number. For purposes of explanation, this predetermined number will be minus (−) 10,000. Each pulse which is received from the one kilohertz clock 28 will augment this number in the time out counter unitl it reaches a second predetermined number. This second predetermined number will be zero. One shot 44 is also coupled to a clock enable flip-flop 46 which provides the third input to clock gate 30. Since the other two inputs to clock gate 30 are usually conductive, clock enable flop 46 determines the conduction of the clock pulses from the 1 kilohertz clock 28 to the time out counter 32.

When the X in OCP 1X54 is a one, NAND gate 40 is enabled. NAND gate 40 provides a signal to clock enable flop 46 resetting the clock enable flop and halting conduction of the pulses from clock gate 30. Since no further pulses are provided, this software instruction insures that the time out counter 32 does not initiate the sequence of operations which would reinitialize the remote processing system 10.

In normal operation decode gate 34 and NAND gate 38 receive an instruction OCP 1054 within a ten second time period thereby enabling one shots 42 and 44 to set the time out counter 32 to its first predetermined number. As long as this operation occurs, time out counter 32 does not overflow, i.e., count out. However, when time out counter 32 has been reduced to zero, it will overflow. This condition would indicate that some kind of malfunction has occurrrd in the normal program operation and that the proper sequence of events is not occurring in remote processor 16. Hence, it is obvious that the time out counter 32 is used to time program operations which operations if they do not occur indicate a malfunction condition. When the time out counter 32 reaches a second predetermined number, i.e., a zero, it provides an enabling signal to overflow flip-flop 48. Once enabled, overflow flip-flop 48 provides the signal to NOR gate 50. NOr gate 50, which has its other inputs connected to pulse generating circuit 26, is enabled by this signal and in turn enables NAND gate 52. NAND gate 52 has its other input connected to the one kilohertz clock 28. With the next pulse from the 1 kilohertz clock, NAND gate 52 provides clock pulses which sequence the pulse generating circuit 26.

More specifically, pulse generating circuit 26 includes a Johnson counter 54. Johnson counter 54 is essentially a decode circuit and increments with each pulse received from NAND gate 52. As is well known, a Johnson counter is functionally a binary ring counter having three stages. In operation, the first pulse provided results in the Johnson counter being set to a binary four state. With the second pulse, the Johnson counter is set to a binary six state, etc. At the end of six pulses, the Johnson counter should return to a binary zero state. The output of the Johnson counter 54 is connected to a plurality of NAND gates which provide a series of operations to initialize the remote processor system 10.

When the Johnson counter 54 is set to a binary four state, master clear gate 56, which is a NAND gate, is enabled. The output of master clear gate 56 provides for three operations. First, clock enable flop 46 is reset and its output disabled. As a result, clock gate 30 is prevented from supplying pulses to time out counter 32. Second, a one shot monostable multivibrator 58 is enabled. This one shot 58 provides a predetermined time delay sufficient to ensure that the remote processor 16 has disconnected itself from the communications link and of sufficient duration to ensure that the central processing system has also disconnected itself from the communications link so that another call may be placed to the remote processor 16. In the preferred embodiment, this predetermined time dealy is from five to ten seconds. One shot 58 accomplishes this time delay by diasbling the operation of the 1 kilohertz clock 28. Thus, as long as one shot 58 is enabled, no further timing pulses are provided by clock 28 since it is disabled. Third, master clear gate 56 resets time out counter 32 such than no further overflow pulses are provided and also resets overflow flip-flop 48. Master clear gate 56 does not effect the binary state in Johnson counter 54. Since the Johnson counter has a binary four state resident therein, and since the Johnson counter has its three stages connected to the input of NOR gate 50, NOR gate 50 is still conductive. One the one kilohertz clock 28 resumes operation, NAND gate 52 will provide pulses to the Johnson counter 54 providing for further sequencing.

When one shot 58 reverts after the time dealy, a one shot monostable multivibrator 60 is enabled. One shot 60 is connected to the data line controller 18. The signal from one shot 60 raises the DTR signal in data line controller 18 such that a phone call, depending on the other criteria explained earlier, may be received by remote processor 16. After the time delay, one shot 58 also provides an enabling signal to 1 kilohertz clock 28. As a result, clock 28 resumes generation of clock pulses.

The next clock pulses provided to NAND gate 54 set the Johnson counter to a binary seven state. This results in Jump gates 61 and 62, which are NAND gates, being enabled. These gates are connected to a program register (not shown) in the remote processor 16. Jump gates 61 and 62 set the program register to the start location for a communications program. This program has the information needed to make the remote processor 16 resume operation.

When the Johnson counter 54 is set to a binary three state, NAND gate 64 generates a run pulse which enables the remote processor's 16 starting circuitry. Thus, NAND gate 64, hereinafter referred to as run gate 64, sets the run flop in the remote processor 16.

Ready gate 66, also a NAND gate, is enabled when the Johnson counter 54 has a binary one state. The operation of this gate is analogous to pushing the key to the remote processor. When the ready gate 66 is enabled, remote processor 16 becomes operational and is ready to receive a messsage from the central processing system.

When the Johnson counter returns to a binary zero state, NOR gate 50 is disabled since the inputs from overflow flip-flop 48 and Johnson counter 54 are all high. As a result, NOR gate 50 does not provide an enabling signal to NAND gate 52 thereby ensuring that no further pulses are delivered to Johnson counter 54. At this time, the remote processor 16 is normalized and watchdog reload initializer 20 may monitor the execution of remote processor 16 instructions.

Reset gate 68, which is also NAND gate, is provided in the event that Johnson counter 54 has an error. Reset gate 68 is responsive to a binary two or five state in the Johnson counter 54. As is apparent, if either binary state is provided by the Johnson counter, then an endless loop operation would ensue. However, either of these numbers enables reset gate 68 which places the Johnson counter 54 back to the zero state such that sequential operations can be restarted.

Since the time out counter 32 was set to a minus (−) 10,000, i.e., the first predetermined number, during the master clear signal from master clear gate 56, it will continue counting to zero unless a software instruction OCP 1054 is received. If the phone 12 is not answered during the ten second time out period provided during time out counter 32, then time out counter 32 will again overflow. Stated differently, if communications between the remote processing system 10 and a central processing system are not initiated in a ten second period subsequent to the ten second predetermined time delay, the watchdog reload initializer provides a second predetermined time period. However, this condition is very unusual since the central data processing system usually will have placed a call by this time.

The overall operation of the watchdog reload initializer 20 will now be considered taking into account FIG. 3 which shows the timing diagram for various components of the watchdog reload initializer 20. More specifically, prior to time $t_o$, the remote processing system 10 is communicating with the central processing system via phone 12. Remote processor 16 is executing program instructions and decode gate 34 and NAND gates 38 and 40 are monitoring these executed instructions. Each time an OCP 1054 instruction is executed, one shot 42 is enabled clearing time out counter 32 and enabling one shot 44. One shot 44 in turn sets the time out counter 32 to its first predetermined number.

At some time prior to time $t_1$, a malfunction in the remote processor 16 has occurred and the time out counter 32 is now approaching its second predetermined number.

Figures 3A, 3B, 3C, 3D, 3E, 3F, 3G, 3H:
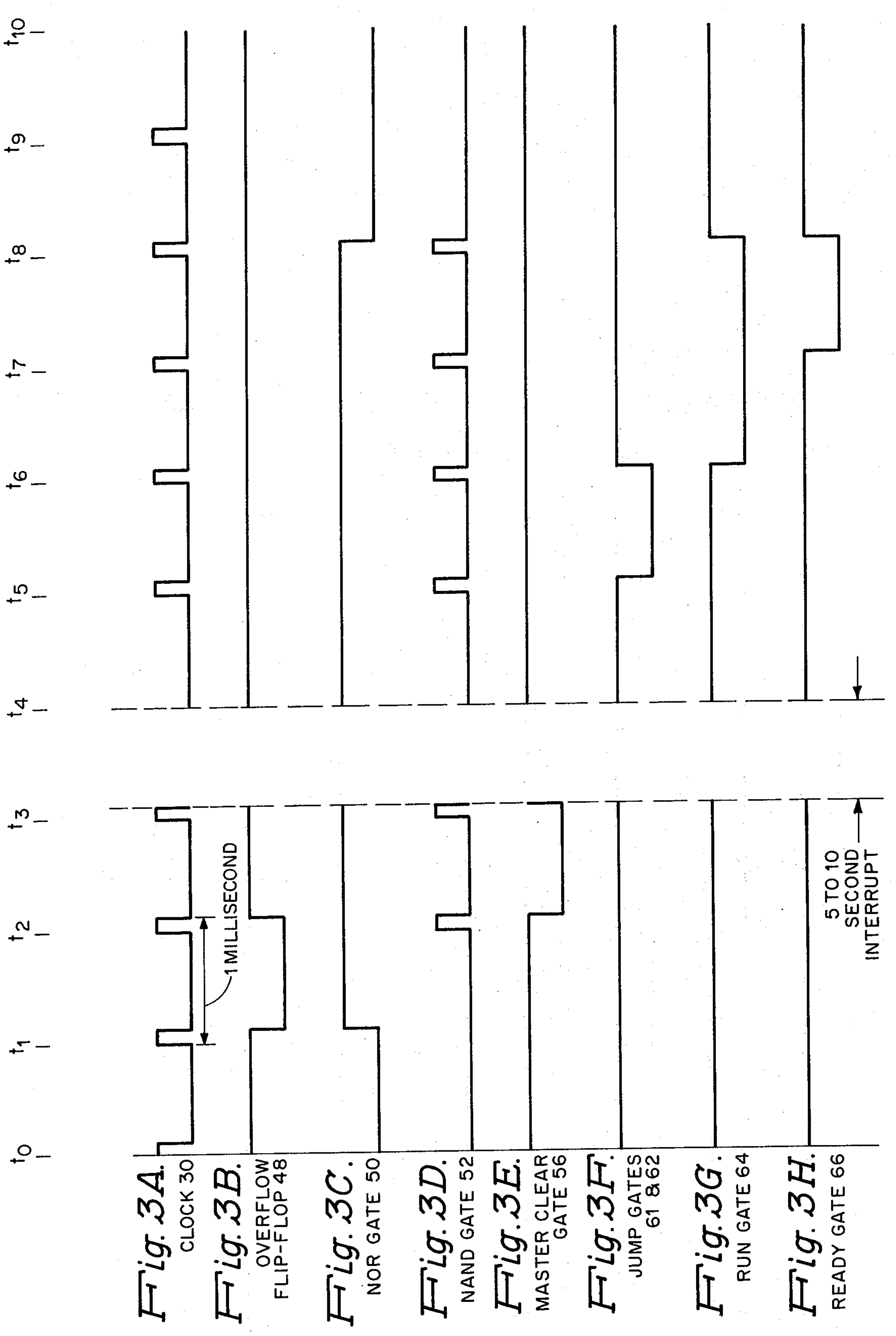

At time $t_o$, the 1 kilohertz clock 28 has a high signal at its input and is providing a series of clock pulses at a 1 millisecond time interval as shown in FIG. 3A. Clock enable flop 46 has all its input connections in a high state and hence is providing an output enabling signal to clock gate 30. Clock gate 30 is providing pulses to time out counter 32 at the rate it receives them from the 1 kilohertz clock 28. Time out counter 32 is changing from its first predetermined number with each pulse received from clock gate 30. NOR gate 50 is not enabled since the overflow flip-flop 48 is not enabled and the Johnson counter 54 is in a binary zero state. As a result, NAND gate 52 is also not enabled.

At time $t_1$, the pulse from clock gate 30 changes the time out counter 32 to its second predetermined number, i.e., zero. The output of time out counter 32 then changes from a low signal to a high signal. In response to this signal change, the output of overflow flip-flop 48 as shown in FIG. 3B, goes from high to low thereby enabling NOR gate 50 to provide a high signal to NAND gate 52 as shown in FIG. 3C. With the next pulse provided by the 1 kilohertz clock 28, NAND gate 52 provides a pulse to Johnson counter 54 as shown in FIG. 3D. Since this next pulse from clock 28 occurs at time $t_2$, the Johnson counter is set at this time to a binary four. This state of the Johnson counter 54 enables the master clear gate 56 whose output signal changes from high to low as shown in FIG. 3E. The high to low transition of master clear gate 56 provides the following operations. First, it resets the clock enable flop 46 thereby disabling the clock pulses of clock gate 30 from going to time out counter 32. Second, it clears time out counter 32 thus changing its output signal from high to low. Third, it resets overflow flip-flop 48 thus changing the signal to NOR gate 50 from low to high. However, NOR gate 50 is also connected to Johnson counter 54 which is providing a low signal and hence NOR gate 50 is still enabled.

At time $t_3$, the clock pulse from the 1 kilohertz clock 28 is transmitted to the Johnson counter 54 via NAND gate 52. At this time, the Johnson counter 54 is set to a binary seven state and a master clear gate 56 changes its signal from low to high. This transition enables one shot 58 which in turn disables clock 28 thus providing a predetermined time delay as shown by the broken lines between times $t_3$ and $t_4$. This predetermined time delay may be from 5 to 10 seconds. During this time delay, the communication link between the remote processing system 10 and the central data processing system is disconnected. Since the entire system has been master cleared, whatever caused the malfunction condition should be obviated.

After one shot 58 has provided its predetermined time delay, its output changes to a low signal enabling the 1 Kilohertz clock 28 to begin operation. Also, the high to low signal from one shot 58 enables one shot 60. One shot 60 is connected to data line controller 18 and when enabled allows the DTR signal in the data line controller 18 to go high. This signal, as explained earlier, indicates that a communication link may now be made.

With the one kilohertz clock reenabled, the signals being sent to the Johnson counter 54 via NAND gate 52 resume. With the next pulse, i.e., at time $t_5$, the Johnson counter is set to a binary seven and jump gates 61 and 52 are enabled as shown in FIG. 3F. With the signal from jump gates 61 and 62, the program register in the remote terminal 16 will be forced to a starting address where a communications program is located. When the central processing system becomes in communication with the remote processing system 10, the starting address location as initiated by jump gates 61 and 62 in addition to the protected core locations in remote processor 16 provide the necessary steps to load the program.

At time $t_6$, Johnson counter 54 is set to a binary three an run gate 64 is enabled as shown in FIG. 3G. Run gate 64 enables the remote processors 16 starting circuitry. The next pulse to Johnson counter 54 sets it to a binary one and enables ready gate 66 as shown in FIG. 3H which triggers the remote processor 16 starting circuitry.

With the next pulse delivered to Johnson counter 54, a zero state in the Johnson counter is realized. This zero state provides all high signals to NOR gate 50. Since the overflow flip-flop 48 is also providing a high signal to NOR gate 50, the output of NOR gate 50 changes from high to low. With one input low, NAND gate 52 is no longer enabled and none of the pulses delivered from the one kilohertz clock 28 are sent to the Johnson counter 54.

As is apparent from the above, the watchdog reload initializer 20 has set up the remote processor 16 and the data line controller 18 so as to receive a communication from the central processing system. Subsequently and within a ten second period as determined by the time out counter 32, the central processing system should send a message to the remote processor 16. Then the watchdog reload initializer 20 will monitor the program execution of the remote processor 16.

The invention has been described with particular reference to the preferred embodiment thereof, but it will be understood that variations and modifications can be affected within the spirit and scope of the invention. Thus, for instance, the NAND, AND, and NOR gates can be replaced by similar equivalents as are well known in computer technology. The Johnson counter 54 may be any ring counter which provides for a series of five or six pulses and then turns off. The one shot 58 and the time out counter 32 may be set to any desired time limitation as long as the intended connections may be made. It is obvious that other modifications and variations within the spirit of the invention may be made.

What is claimed is:

1. In a communication system having a remote processing system coupled to a communication link, an apparatus for normalizing said remote processing system when a communication malfunction occurs, said apparatus comprising:

means for storing a first predetermined number, circuit means for changing said first predetermined number to a second predetermined number, said storing means providing a first signal responsive to said second predetermined number, said first signal indicating a malfunction has occurred, means responsive to said first signal for sequencing a series of operations, said sequencing means comprising:

means responsive to said second predetermined number for disabling said circuit means and disconnecting said remote processing system from said communication link, and means responsive to said disabling means for generating a predetermined time delay, said generating means after said predetermined time delay enabling said remote processing system to resume communication on said communication link.

2. An apparatus as defined in claim 1 wherein said sequencing means further includes;

counter means responsive to said first signal and said circuit means for providing a plurality of distinct second signals.

3. An apparatus as defined in claim 2 wherein:

said sequencing means further includes a plurality of gates, each of said gates being responsive to one of said plurality of distinct second signals of said counter means, said gates providing for said normalizing of said remote processing system.

4. An apparatus as defined in claim 3 wherein said remote processing system includes a remote processor having a program register, a data line controller and a data set, and wherein said plurality of gates includes:

first gates for initializing said program register to a starting location in said remote processor, a second gate for initializing the starting circuitry of said remote processor, and a third gate for enabling said remote processor to receive a communication via said data line controller and said data set.

5. A watchdog reload initializer for use in a remote processing communication system comprising:

means for determining that a malfunction has occurred in said remote processing system, means for loading said predetermining means to indicate a first predetermined number, circuit means for generating a first series of signals to said determining means, each pulse changing said first predetermined number in said determining means, said determining means providing a first signal when a second predetermined number is reached, means responsive to said circuit means and to said first signal for providing a second series of signals, and pulse generating circuit means responsive to said providing means for generating a series of operations to normalize said remote processing system such that said malfunction may be obviated.

6. An initializer as defined in claim 5 wherein said remote processing system includes a communication link and wherein said pulse generating circuit means includes:

interrupt means responsive to an initial signal of said second series of signals for providing a predetermined time delay such that said remote processing system disconnects itself from said communication link, said interrupt means also disabling said circuit means such that said first series of signals is discontinued, and means responsive to the end of said predetermined time delay for enabling said remote processing system to be connected to said communication link.

7. An initializer as defined in claim 5 wherein:

said pulse generating circuit means includes a counter, said providing means provides said second series of signals to said counter, and said providing means is initially enabled by said first signal, said counter thereafter providing said second series of signals to said providing means, said counter capable of providing only a fixed number of said second series of signals to said providing means before becoming disabled.

8. An initializer as defined in claim 7 wherein said counter is a Johnson counter.

9. An initializer as defined in claim 5 wherein:

said circuit means includes clock means for providing said first series of signals at a predetermined rate, clock enable means responsive to said loading means for providing a second signal, said clock enable means reset by said pulse generating circuit means, and gating means responsive to said loading means, to said circuit means and to said second signal, said gating means when enabled transmitting said first series of signals to said determining means to change said first predetermined number.

10. An initializer as defined in claim 9 wherein said loading means is a detecting circuit responsive to a software instruction having a predetermined value, wherein said predetermined value may be in a first state whereupon said counting means is loaded to a first predetermined number, and said predetermined value may be in a second state whereupon said counting means will not be loaded to said first predetermined number.

11. A method for automatically normalizing a remote processing unit vis-a-vis a communication link, said method comprising the steps of:

detecting when a malfunction in said remote processing unit occurs, halting the execution of instructions in said remote processing unit, master clearing selected circuitry within said remote processing unit, providing a first predetermined time delay to allow said remote processing unit to disconnect from said communication link, forcing the program register of said remote processing unit to a predetermined address such that a communications program can be executed, and enabling said remote processing unit to execute said communication program such that communication via said communication link is established.

12. A method as defined in claim 11 wherein the master clearing step includes:

clearing a time out counter in said remote processor, resetting a multivibrator clock circuit in said remote processing unit, and clearing an overflow gate of an overflow signal in said remote processing unit.

13. A method as defined in claim 12 and further including the steps of:

providing a second predetermined time delay subsequent to said first predetermined time delay, said second predetermined time delay enabling a data controller in a remote processing system to be set such that said remote processor is ready to receive a message from said communication link.

* * * * *

UNITED STATES PATENT OFFICE

CERTIFICATE OF CORRECTION

Patent No. 3,795,800 Dated March 5, 1974

Inventor(s) John L. Nimmo and Peter I. Morley

It is certified that error appears in the above-identified patent and that said Letters Patent are hereby corrected as shown below:

In the Claims, column 10, claim 5, line 49, change "predetermining" to --determining--.

Signed and sealed this 9th day of July 1974.

(SEAL)
Attest:

McCOY M.GIBSON,JR.
Attesting Officer

C. MARSHALL DANN
Commissioner of Patents